US012780573B2

(12) United States Patent
Kiyokawa

(10) Patent No.: US 12,780,573 B2
(45) Date of Patent: Nov. 3, 2026

(54) LIFTING DEVICE

(71) Applicant: Daifuku Co., Ltd., Nishiyodogawa-ku (JP)

(72) Inventor: Wataru Kiyokawa, Tokyo (JP)

(73) Assignee: Daifuku Co., Ltd., Nishiyodogawa-ku (JP)

( * ) Notice: Subject to any disclaimer, the term of this patent is extended or adjusted under 35 U.S.C. 154(b) by 384 days.

(21) Appl. No.: 18/465,506

(22) Filed: Sep. 12, 2023

(65) Prior Publication Data

US 2024/0140740 A1 May 2, 2024

(30) Foreign Application Priority Data

Oct. 26, 2022 (JP) ................................ 2022-171276

(51) Int. Cl.
*B65G 69/24* (2006.01)
*B65G 67/02* (2006.01)

(52) U.S. Cl.
CPC .............. *B65G 69/24* (2013.01); *B65G 67/02* (2013.01)

(58) Field of Classification Search
CPC ........ B65G 67/02; B65G 67/04; B65G 67/08; B65G 67/20; B65G 67/24; B65G 69/24
USPC ................................ 414/391, 392, 396, 584
See application file for complete search history.

(56) References Cited

U.S. PATENT DOCUMENTS 5,082,415 A * 1/1992 Hayashi ................ B65G 67/20 414/398
5,513,936 A * 5/1996 Dean ......................... B66F 7/08 414/640

FOREIGN PATENT DOCUMENTS

CN 110498266 A * 11/2019 ............ B65G 69/24
CN 215797263 U 2/2022
JP 2-48398 A 2/1990
JP 2001-301988 A 10/2001
JP 2002211747 A * 7/2002 ............ B65G 67/08
JP 2003-246465 A 9/2003
JP 2017-197374 A 11/2017

OTHER PUBLICATIONS

Full English translation of CN 215797263 (Dong et al), (Year: 2022).*

(Continued)

*Primary Examiner* — James Keenan

(74) *Attorney, Agent, or Firm* — Oblon, McClelland, Maier & Neustadt, L.L.P.

(57) ABSTRACT

A lifting device includes: a lifting mechanism configured to move up and down a placement portion on which a conveyed object is placed; a distance sensor configured to output a detection signal indicating a distance to a surface to be detected of a moving object in a state of being located above the surface; a support member configured to support the distance sensor; a movement mechanism configured to move at least a part of the support member between a measurement position where the distance sensor is located and a retraction position where the distance sensor and the support member are deviated from above the moving object; and a lifting controller configured to control the lifting mechanism such that the placement portion is aligned with the moving object at a position where the conveyed object is allowed to be transferred in a lateral direction based on the detection signal.

6 Claims, 5 Drawing Sheets

(56) References Cited

OTHER PUBLICATIONS

Japanese Office Action issued May 7, 2025, in corresponding Japanese Patent Application No. 2022-171276 (with English Translation), 9 pages.

* cited by examiner

LIFTING DEVICE

The present application claims priority to and incorporates by reference the entire contents of Japanese Patent Application No. 2022-171276 filed in Japan on Oct. 26, 2022.

BACKGROUND

The present disclosure relates to a lifting device. In the related art, there has been known a lifting device that vertically aligns an article placement portion which moves up and down with a truck in order to smoothly transfer the article to and from the truck (e.g., JP 2003-246465 A).

SUMMARY

It is beneficial if, as this type of lifting device, a lifting device, whose configuration is further simplified or which is not easily damaged by an unexpected erroneous operation, erroneous activation, and the like, is obtained.

There is a need for an improved novel lifting device whose configuration is further simplified and which is not easily damaged by an unexpected erroneous operation, erroneous activation, and the like, for example.

According to one aspect of the present disclosure, there is provided a lifting device including: a lifting mechanism configured to move up and down a placement portion on which a conveyed object is placed; a distance sensor configured to output a detection signal indicating a distance to a surface to be detected of a moving object in a state of being located above the surface to be detected; a support member provided on the placement portion and configured to support the distance sensor; a movement mechanism configured to move, with respect to the placement portion, at least a part of the support member between a measurement position where the distance sensor is located above the surface to be detected and a retraction position where the distance sensor and the support member are deviated from above the moving object; and a lifting controller configured to control the lifting mechanism such that the placement portion is aligned with the moving object at a position where the conveyed object is allowed to be transferred in a lateral direction based on the detection signal.

DETAILED DESCRIPTION

Exemplary embodiments will be disclosed below. The configurations of the embodiments described below and the functions and results (effects) obtained from the configurations are examples. The present disclosure may also be achieved by a configuration other than those disclosed in the following embodiments. Furthermore, according to the present disclosure, at least one of various effects (including derivative effects) obtained by the following configurations may be obtained.

A plurality of embodiments described below includes a similar configuration. According to the embodiments, similar effects based on the similar configuration may be obtained. Note that, in the following description, similar components may be denoted by common reference signs, and redundant description may be omitted.

Furthermore, in the present specification, ordinal numbers are given for convenience in order to distinguish parts, positions, and the like. The ordinal numbers do not indicate priority or order, and do not limit the number.

Furthermore, in each figure, an arrow indicating a direction is drawn. An X direction and a Y direction are substantially along a horizontal direction. A Z direction is substantially along a vertically upward direction. The X direction, the Y direction, and the Z direction are orthogonal to each other. Note that the Z direction is also referred to as a height direction.

Figure 1:
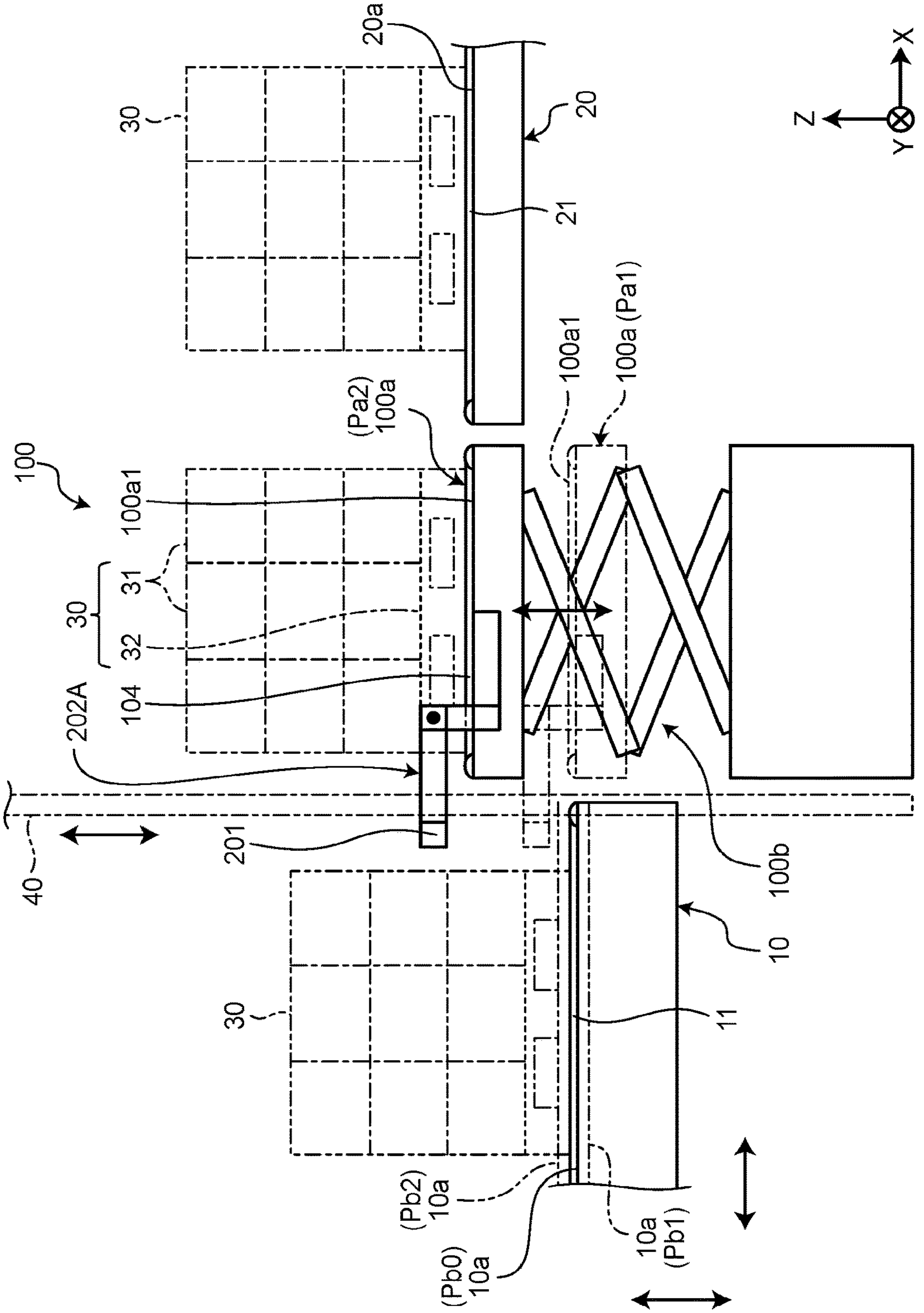
FIG. 1 is an exemplary and schematic side view of a lifting device of a first embodiment.

FIG. 1 is a side view of a lifting device 100 according to a first embodiment. As illustrated in FIG. 1, for example, when a height of a part, on which a conveyed object 30 is placed, of a moving object 10 such as a truck is different from that of an entrance structure 20 of a building or equipment, the lifting device 100 enables the conveyed object 30 to move between the moving object 10 and the entrance structure 20 by moving the conveyed object 30 between the moving object 10 and the entrance structure 20 up and down.

The lifting device 100 includes a placement portion **100*a* on which the conveyed object 30 is placed. The placement portion 100*a* moves up and down at least between a position Pa1 and a position Pa2. The position Pa1 is aligned with the moving object 10 in the X direction. The position Pa2 is aligned with the entrance structure 20 in the X direction. In a state where the placement portion 100*a* is located at the position Pa1, the conveyed object 30 is moved between the moving object 10 and the placement portion 100*a* by, for example, a conveyance mechanism 11 and a conveyance mechanism 104. The conveyance mechanism 11 is provided on the moving object 10. The conveyance mechanism 104 is provided on the placement portion 100*a*. Furthermore, in a state where the placement portion 100*a* is located at the position Pa2, the conveyed object 30 is moved between the entrance structure 20 and the placement portion 100*a* by, for example, a conveyance mechanism 21 and the conveyance mechanism 104. The conveyance mechanism 21 is provided on the entrance structure 20. The conveyance mechanism 104 is provided on the placement portion 100*a***.

The conveyance mechanisms 11, 21, and 104 are, for example, conveyors. Various conveyors may be adopted as the conveyors.

The moving object 10 may move in the X direction and a direction opposite to the X direction. The moving object 10 is, for example, a truck, but is not limited thereto. The moving object 10 may be, for example, an automated guided vehicle.

The height of the moving object 10 at which the conveyed object 30 is placed (position in Z direction, hereinafter, referred to as placement position) differs due to a specification and varies due to an individual difference. Specifically, the placement position is, for example, a ground height of a bed of a truck. The lifting device 100 of the embodiment may smoothly transfer the conveyed object 30 between the placement portion 100*a* and the moving object 10 without any problem even when the placement position differs due to a specification and varies due to an individual difference. Furthermore, when the moving object 10 is a vehicle having a suspension such as a truck, the placement position changes depending on the loaded state of the conveyed object 30. The lifting device 100 of the embodiment may smoothly transfer the conveyed object 30 between the placement portion 100*a* and the moving object 10 without any problem even when the placement position of the moving object 10 changes over time. A specific configuration of the lifting device 100 that deals with a difference due to a specification and a variation due to an individual difference of the placement position of the moving object 10, a change over time, and the like as described above will be described later.

In contrast, in the embodiment, the placement position of the entrance structure 20 is basically fixed, and does not change over time. Note that the entrance structure 20 is provided at, for example, a boundary between a building or equipment and the outside, but this is not a limitation. The entrance structure 20 may be provided in the building.

The conveyance mechanisms 11, 21, and 104 and the lifting device 100 convey the conveyed object 30. The conveyed object 30 includes, for example, an article 31 and a pallet 32. The article 31 is placed on the pallet 32. A plurality of articles 31 may be stacked on the pallet 32. The conveyed object 30 is conveyed in a form of the pallet 32 alone or in a form in which at least one article 31 is stacked on the pallet 32. The article 31 is, for example, a product package. Note that the article 31 has, for example, a box shape, but this is not a limitation.

The lifting device 100 includes the placement portion 100*a*, a movable portion 100*b*, a drive mechanism 101 (see FIG. 2), and the above-described conveyance mechanism 104. The conveyed object 30 is placed on the placement portion 100*a*. The movable portion 100*b* moves the placement portion 100*a* up and down. The drive mechanism 101 moves the movable portion 100*b*. In the embodiment, the movable portion 100*b* and the drive mechanism 101 constitute a lifting mechanism that moves the placement portion 100*a* up and down. The movable portion 100*b* is configured as, for example, a link mechanism. A lower end position in the Z direction of the link mechanism is fixed, and the link mechanism expands and contracts in the Z direction. The placement portion 100*a* is provided at an upper end of the link mechanism. Note, however, that the configurations of the placement portion 100*a* and the lifting mechanism are not limited thereto.

Figure 2:
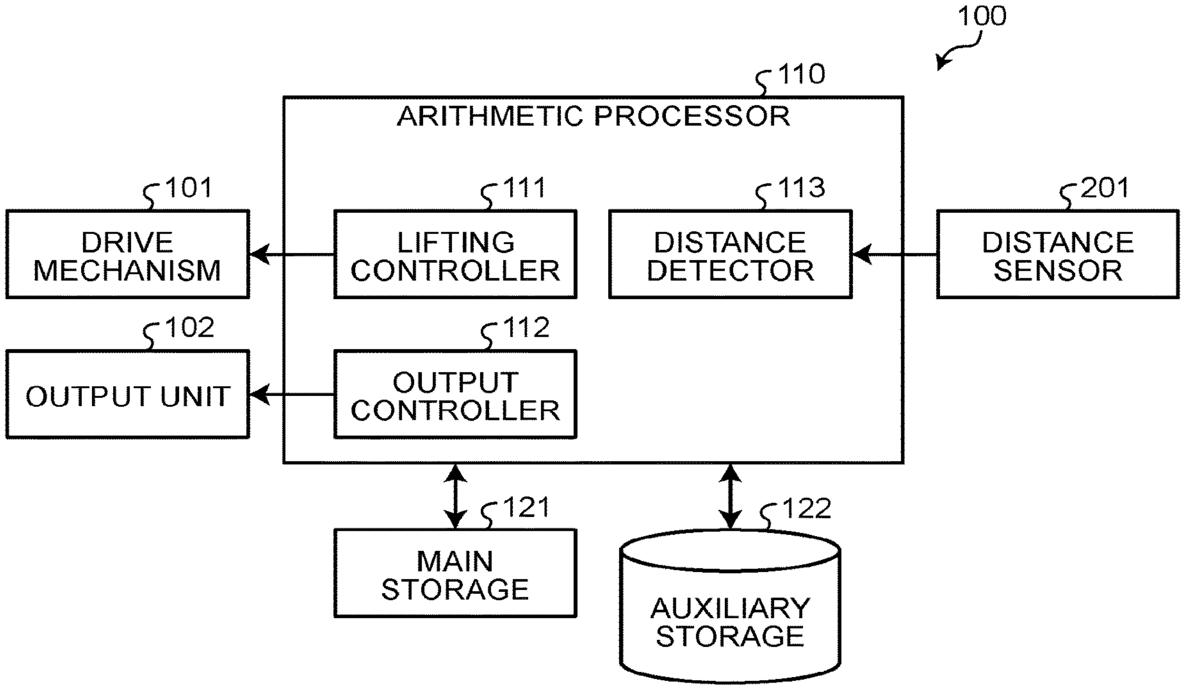
FIG. 2 is an exemplary block diagram of the lifting device of the first embodiment.

FIG. 2 is a block diagram of the lifting device 100 of the first embodiment. As illustrated in FIG. 2, the lifting device 100 includes a computer, and includes an arithmetic processor 110, a main storage 121, and an auxiliary storage 122.

The arithmetic processor 110 is, for example, a processor (circuit). The main storage 121 is, for example, a random access memory (RAM) or a read only memory (ROM). The auxiliary storage 122 is, for example, a hard disk drive (HDD) or a solid state drive (SSD). The arithmetic processor 110 reads and executes a program (application) stored in the ROM of the main storage 121 or the auxiliary storage 122. The processor is activated as a lifting controller 111, an output controller 112, and a distance detector 113 by being activated in accordance with the program. In this case, the program includes a program module corresponding to each of the lifting controller 111, the output controller 112, and the distance detector 113.

The program may be provided by being recorded in a computer-readable recording medium in a file in an installable format or an executable format. The recording medium may also be referred to as a program product. Furthermore, the program may be introduced to a computer connected to a communication network by being stored in a storage of the computer and downloaded via the network. Furthermore, the program may be preliminarily incorporated in the ROM or the like.

Furthermore, when at least a part of the computer is configured by hardware, the computer may include, for example, a field programmable gate array (FPGA) and an application specific integrated circuit (ASIC).

The ROM of the main storage 121 or the auxiliary storage 122 stores information used in arithmetic processing performed by the lifting controller 111, the output controller 112, and the distance detector 113. Furthermore, the information used in the arithmetic processing may be written in the program.

Furthermore, the drive mechanism 101, an output unit 102, and a distance sensor 201 are electrically connected to the arithmetic processor 110.

The lifting controller 111 controls the drive mechanism 101, that is, the lifting mechanism such that the placement portion 100*a* moves up and down and stands still at a predetermined position. The drive mechanism 101 includes, for example, a motor, a speed reduction mechanism, and a rotation linear motion conversion mechanism.

The output controller 112 controls the output unit 102 such that the output unit 102 gives predetermined display output or voice output. The output unit 102 is, for example, a display, a lamp, and a speaker. The output controller 112 may control the output unit 102 such that the output unit 102 gives predetermined display output or voice output at predetermined timing such as timing when the placement portion 100*a* is located at the position Pa1 or Pa2.

The distance detector 113 detects the distance between the distance sensor 201 and a surface 10*a* based on a detection signal of the distance sensor 201.

At the position Pa1 (see FIG. 1) of the placement portion 100*a*, the placement portion 100*a* is aligned with the moving object 10 in the X direction, and the conveyance mechanisms 11 and 104 may deliver the conveyed object 30 between the placement portion 100*a* and the moving object 10 in a lateral direction intersecting a vertical direction, that is, the X direction or the direction opposite to the X direction.

The surface 10*a* (see FIG. 1) of the moving object 10 to be detected by the distance sensor 201 is a flat surface facing upward, and is, for example, a part of an upper surface of a base that supports the conveyance mechanism 11. The part is shifted from the conveyance mechanism 11 in the Y direction or a direction opposite to the Y direction. The surface 10*a* is only required to have no obstacle above the surface 10*a* against detection performed by the distance sensor 201, and is not required to be located at the uppermost end of the moving object 10. The surface 10*a* is one example of a surface to be detected.

In one example, when a protruding height of the conveyance mechanism 11 from the surface 10*a* of the moving object 10 is the same as a protruding height of the conveyance mechanism 104 from a surface 100*a*1 facing upward of the placement portion 100*a*, the surface 10*a* is substantially aligned with the surface 100*a*1 in the X direction at the position Pa1.

Here, as described above, the position of the surface 10*a* in the Z direction may be variously changed like positions Pb0, Pb1, and Pb2 in FIG. 1 in accordance with a difference due to a specification and a variation due to an individual difference of the placement position of the moving object 10, a change over time, and the like. Thus, in the embodiment, the distance sensor 201 is provided.

As illustrated in FIG. 1, the distance sensor 201 is a non-contact sensor that outputs a detection signal in accordance with the distance to the surface 10*a* in a state of being located above the surface 10*a*, and is, for example, a laser displacement meter, specifically.

The lifting controller 111 calculates the position Pa1 of the placement portion 100*a* corresponding to the position of the moving object 10 in the Z direction based on the distance obtained from the detection signal of the distance sensor 201, and controls the drive mechanism 101, that is, the lifting mechanism such that the placement portion 100*a* stops at the position Pa1.

The distance sensor 201 outputs a detection signal, the distance detector 113 calculates a distance, the lifting controller 111 calculates the position Pa1 based on the distance, and the drive mechanism 101 performs control of stopping the placement portion 100*a* at the position Pa1 appropriately at predetermined timing, such as timing when the moving object 10 is replaced and timing when the placement portion 100*a* moves down toward the position Pa1. Therefore, according to the embodiment, the placement portion 100*a* may be stopped at the appropriate position Pa1 adapted for the moving object 10 regardless of a difference due to a specification and a variation due to an individual difference of the placement position of the moving object 10, a change over time, and the like.

In contrast, at the position Pa2 (see FIG. 1) of the placement portion 100*a*, the placement portion 100*a* is aligned with the entrance structure 20 in the X direction, and the conveyance mechanisms 21 and 104 may deliver the conveyed object 30 between the placement portion 100*a* and the entrance structure 20 in the lateral direction intersecting the vertical direction, that is, the X direction or the direction opposite to the X direction.

In one example, when a protruding height of the conveyance mechanism 21 from a surface 20*a* facing upward of the entrance structure 20 is the same as a protruding height of the conveyance mechanism 104 from the surface 100*a*1 of the placement portion 100*a*, the surface 20*a* is substantially aligned with the surface 100*a*1 in the X direction at the position Pa2.

When the position of the entrance structure 20 in the Z direction is unchanged, the position Pat of the placement portion 100*a* is also unchanged. In this case, control of the position of the placement portion 100*a* in the Z direction based on a detection signal from the distance sensor 201 is basically unnecessary for alignment of the placement portion 100*a* with the entrance structure 20 in the Z direction.

Figure 3:
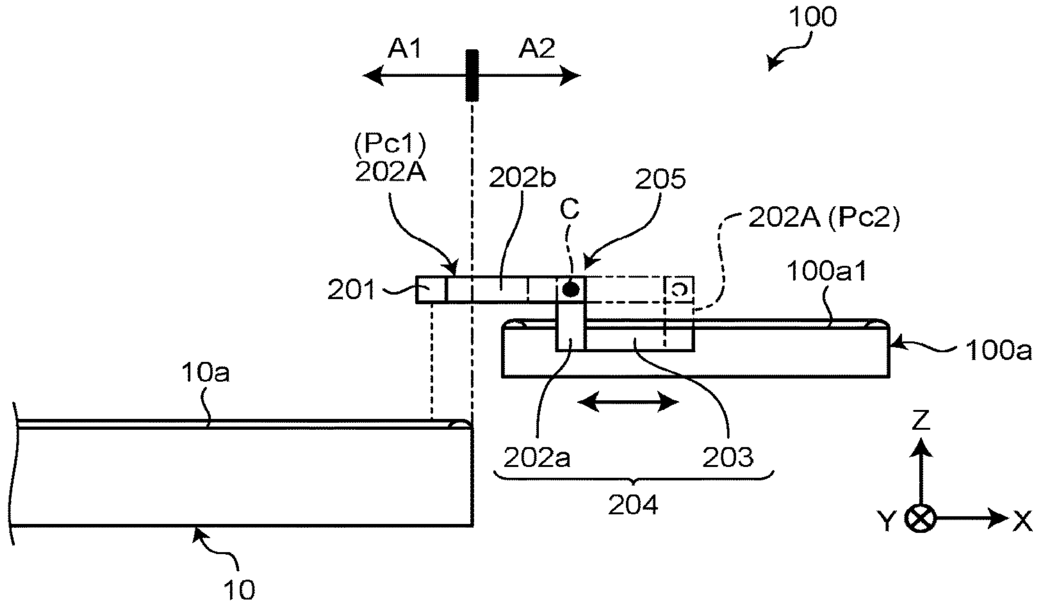
FIG. 3 is an exemplary and schematic side view of a part of the lifting device of the first embodiment, and illustrates a normal use state.

FIG. 3 is a side view of a part of the lifting device 100 of the first embodiment, and illustrates a normal use state. The distance sensor 201 is supported by a support member 202A. The distance sensor 201 emits laser light downward toward the surface 10*a* in a state of being located above the surface 10*a*, and receives light as a result of the laser light being reflected on the surface 10*a*. The distance sensor 201 outputs a detection signal indicating the distance to the surface 10*a*.

The placement portion 100*a* is provided with a rail 203 extending in the X direction. A base portion 202*a* serving as a part of the support member 202A is supported by the rail 203 so as to be able to slide along the rail 203 in the X direction and the direction opposite to the X direction. The base portion 202*a* and the rail 203 constitute a linear motion mechanism 204 that linearly moves the support member 202A and the distance sensor 201 with respect to the placement portion 100*a*.

The linear motion mechanism 204 enables the entire support member 202A to move between a position Pc1 and a position Pc2 and to stop at each of the position Pc1 and the position Pc2 with respect to the placement portion 100*a*. Note that the base portion 202*a*, that is, the support member 202A may be moved and stopped along the rail 203 manually or electrically in accordance with an operation via an operation button and the like.

In a state where the support member 202A is located at the position Pc1, the distance sensor 201 is located above the surface 10*a*, and may measure the distance to the surface 10*a*. The position Pc1 is one example of a measurement position.

In contrast, in a state where the support member 202A is located at the position Pc2, the distance sensor 201 is deviated from above the surface 10*a*, and the measurement is made impossible. Furthermore, the support member 202A and the distance sensor 201 wholly move into an area A2 deviated from an area A1 above the moving object 10. The position Pc2 is one example of a retraction position.

In a state where the support member 202A is located at the position Pc2, even if the placement portion 100*a* erroneously and excessively moves down, the distance sensor 201 and the support member 202A do not interfere with the moving object 10.

That is, according to the embodiment, the lifting device 100 includes the linear motion mechanism 204 that enables the support member 202A to move between the position Pc1 and the position Pc2, and retracts the distance sensor 201 and the support member 202A to the position Pc2. This may inhibit the distance sensor 201 and the support member 202A from interfering with the moving object 10 and being damaged even when the placement portion 100*a* moves up and down due to an erroneous operation, an erroneous activation, and the like of the lifting mechanism.

Furthermore, when a vertically movable shutter 40 is provided on the lifting device 100 on a side opposite to the entrance structure 20 as illustrated in FIG. 1, the position Pc2 may be defined as a position where the lifting device 100 does not interfere with the shutter 40 located at a closed position (e.g., moved-down position).

That is, according to the embodiment, the lifting device 100 includes the linear motion mechanism 204 that enables the support member 202A to move between the position Pc1 and the position Pc2, and retracts the distance sensor 201 and the support member 202A to the position Pc2. This may inhibit the distance sensor 201 and the support member 202A from interfering with the shutter 40 and being damaged even when the shutter 40 moves down to the closed position due to an erroneous operation, an erroneous activation, and the like.

Moreover, as illustrated in FIG. 3, in the embodiment, the support member 202A includes the base portion 202*a* and a distal end portion 202*b*. The base portion 202*a* and the distal end portion 202*b* are connected to each other so as to be able to rotate about a rotation center C along the Y direction. In other words, the base portion 202*a* and the distal end portion 202*b* are connected via a rotation mechanism 205. Then, the distance sensor 201 is attached to the distal end portion 202*b*. The distal end portion 202*b* may also be referred to as a movable portion.

In a normal use state, that is, a measurement state, the distal end portion 202*b* extends in the direction opposite to the X direction from a connection portion with the base portion 202*a* to above the moving object 10. That is, the base portion 202*a* supports the distal end portion 202*b* in the state illustrated in FIG. 3. Furthermore, the distal end portion 202*b* is connected to the base portion 202*a* in a state of being able to rotate about the rotation center C in a clockwise direction in a line of sight of FIG. 3. The base portion 202*a* limits rotation of the distal end portion 202*b* in a counter-clockwise direction from the state of FIG. 3.

Figure 4:
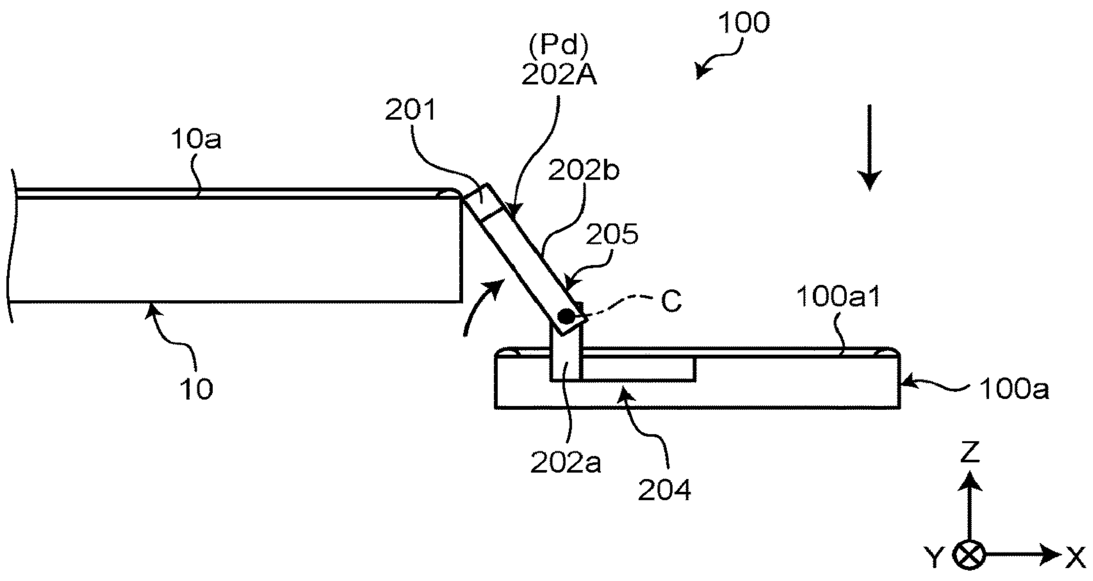
FIG. 4 is an exemplary and schematic side view of a part of the lifting device of the first embodiment, and illustrates a state where a placement portion has overrun downward.

FIG. 4 is a side view of a part of the lifting device 100 of the first embodiment. FIG. 4 illustrates a state where the placement portion 100*a* has overrun downward beyond the position Pa1 (see FIG. 1) with the support member 202A being located at the position Pc1. As illustrated above, in the embodiment, the distal end portion 202*b* is connected to the base portion 202*a* in a state of being able to rotate about the rotation center C in a clockwise direction in a line of sight of FIG. 3. For this reason, as illustrated in FIG. 4, when interfering with the moving object 10 due to a downward overrun of the placement portion 100*a*, the distance sensor 201 or the distal end portion 202*b* is relatively pressed by the moving object 10, rotates in the clockwise direction in FIG. 4 about the rotation center C, and escapes to a side of the moving object 10, that is, in the X direction in the example of FIG. 4. If such interference occurs in a case where the support member does not include the rotation mechanism 205, the support member or the distance sensor 201 may be damaged. In this regard, in the embodiment, the support member 202A includes the rotation mechanism 205. Even when such interference occurs, the distance sensor 201 and the distal end portion 202*b* may escape to the side of the moving object 10, which may inhibit damage of the distance sensor 201 and the support member 202A. The rotation mechanism 205 is one example of an evacuation mechanism.

Figure 5:
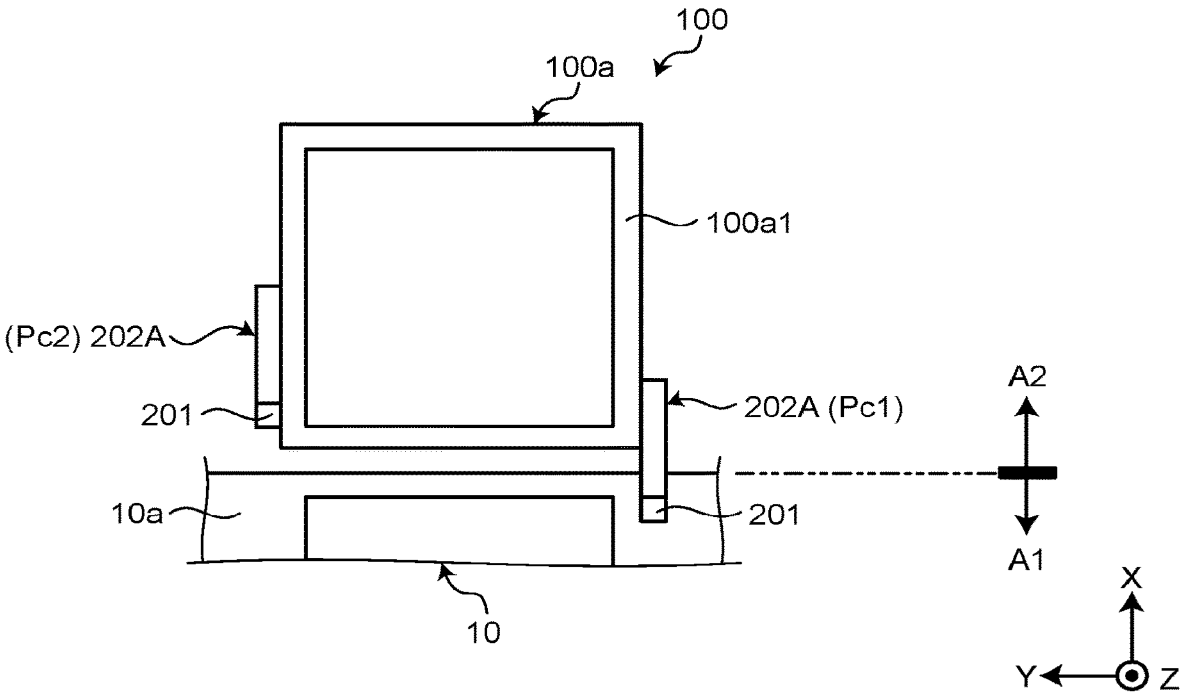
FIG. 5 is an exemplary and schematic plan view of a part of the lifting device of the first embodiment.

FIG. 5 is a plan view of a part of the lifting device 100 of the first embodiment. As illustrated in FIG. 5, the lifting device 100 includes a plurality of support members 202A and distance sensors 201 provided on the support members 202A. In one example, a set of a support member 202A and a distance sensor 201 (hereinafter, referred to as subassembly) is provided at each of ends of the placement portion 100*a* in the Y direction and the direction opposite to the Y direction. In this case, an operator at a site may select and use one of a plurality of subassemblies depending on usability, a surrounding situation, and the like. FIG. 5 illustrates a case where only a subassembly located at an end in the direction opposite to the Y direction (right side in FIG. 5) is used. In this case, a support member 202A of the subassembly to be used on the right side in FIG. 5 may be defined as being located at the position Pc1. A support member 202A of a subassembly not to be used on the left side in FIG. 5 may be defined as being located at the position Pc2. That is, according to the embodiment, for example, effects of improving usability of an operator and reliably controlling the position of the placement portion 100*a* based on a detection signal from the distance sensor 201 regardless of a surrounding environment may be obtained by the lifting device 100 including a plurality of subassemblies, that is, the distance sensors 201 and the support members 202A.

Furthermore, the lifting controller 111 may execute control using distances obtained by detection signals from the plurality of distance sensors 201. Specifically, for example, the lifting controller 111 may control the placement portion 100*a* based on an average value of the distances obtained by detection signals from the plurality of distance sensors 201 and the like. Furthermore, for example, the lifting controller 111 may calculate an inclination from a difference between the distances obtained by detection signals from the plurality of distance sensors 201. When the difference or the inclination exceeds a corresponding threshold, the lifting controller 111 may determine that an abnormality has occurred, and control the drive mechanism 101 such that the drive mechanism 101 stops moving up and down. Moreover, in that case, the output controller 112 may control the output unit 102 such that the output unit 102 outputs a predetermined alarm.

According to the above-described embodiment, a relatively simple configuration may achieve the lifting device 100 that may stop the placement portion 100*a* at the appropriate position Pa1 adapted for the moving object 10 regardless of a difference due to a specification and a variation due to an individual difference of the placement position of the moving object 10, a change over time, and the like. Furthermore, the lifting device 100 that is not easily damaged by an unexpected erroneous operation, erroneous activation, and the like may be achieved by the linear motion mechanism 204 serving as a movement mechanism and the rotation mechanism 205 serving as an evacuation mechanism.

Figure 6:
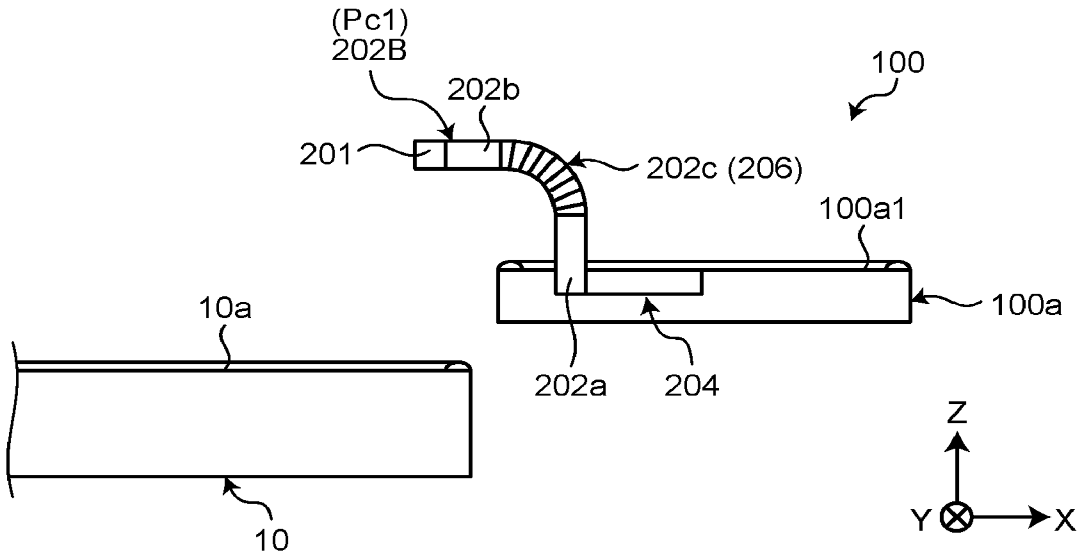
FIG. 6 is an exemplary and schematic side view of a part of a lifting device of a second embodiment.

FIG. 6 is a side view illustrating a part of the lifting device 100 of a second embodiment. As illustrated in FIG. 6, in the embodiment, a support member 202B partially includes a flexible arm 202*c* whose shape may be freely changed and set. In the example of FIG. 6, the flexible arm 202*c* is located between the base portion 202*a* and the distal end portion 202*b*. The flexible arm 202*c* includes, for example, a plurality of small pieces connected in series. The flexible arm 202*c* has a configuration in which adjacent small pieces, a small piece and the base portion 202*a*, and a small piece and the distal end portion 202*b* are connected so as to be able to relatively rotate and relative rotation postures may be maintained by friction therebetween.

According to such a configuration, an operator appropriately changes the shape of the flexible arm 202*c* to obtain effects of disposing the distance sensor 201 at a position where a detection signal has higher strength, disposing the distance sensor 201 at a position where interference with another part of the moving object 10 is avoided, and improving usability of the operator, for example. Note that the shape, structure, arrangement, and the like of the flexible arm 202*c* are not limited to those in the example of FIG. 6.

Furthermore, the flexible arm 202*c* may function as an evacuation mechanism 206 that lets at least a part of the distance sensor 201 and the support member 202B to escape to a side of the moving object 10 in a case where the evacuation mechanism 206 interferes with the moving object 10. The flexible arm 202*c* may also be referred to as a buffer mechanism. Moreover, the distance sensor 201 and the support member 202B may be configured to be wholly deviated from above the moving object 10 in a posture in which the flexible arm 202*c* extends upward. In this case, the position of the support member 202B in the extending posture is the retraction position. According to the configuration, the linear motion mechanism 204 is unnecessary, so that a device configuration may be further simplified. Thus, for example, effects of further reducing the weight of the lifting device 100 and further reducing labor and cost for manufacturing may be obtained.

Figure 7:
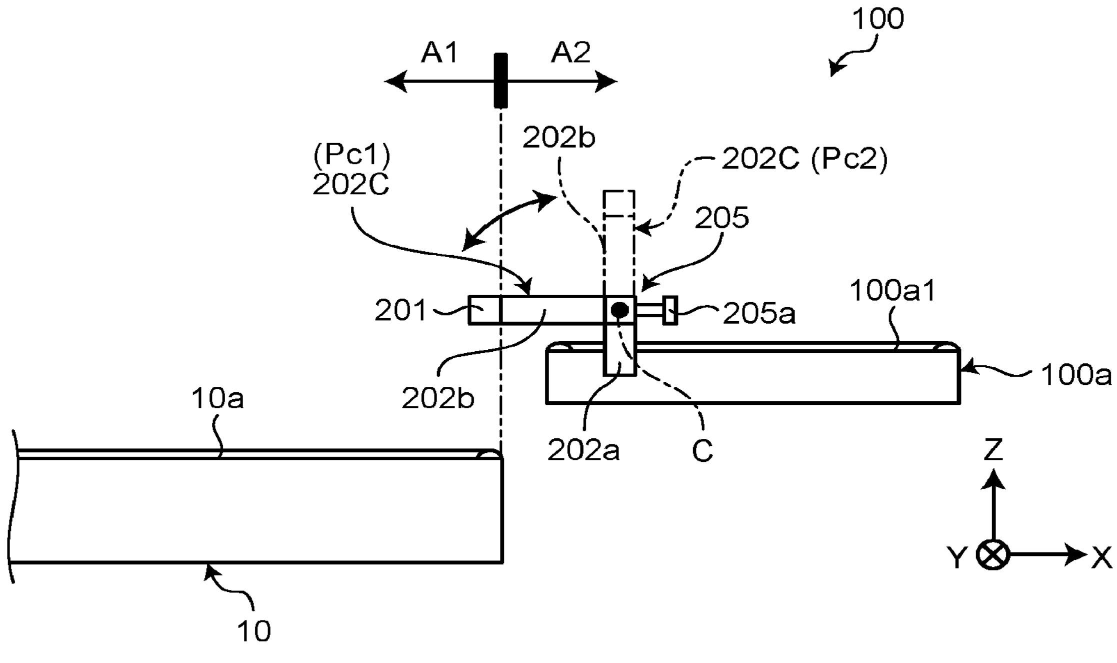
FIG. 7 is an exemplary and schematic side view of a part of a lifting device of a third embodiment.

FIG. 7 is a side view illustrating a part of the lifting device 100 of a third embodiment. In the embodiment, the rotation mechanism 205 functions as both the movement mechanism and the evacuation mechanism. That is, the base portion 202*a* is fixed to the placement portion 100*a*. Furthermore, the rotation mechanism 205 supports the distal end portion 202*b* of a support member 202C with respect to the base portion 202*a* and the placement portion 100*a* about the rotation center C between the position Pc1 and the position Pc2. At the position Pc1, the distal end portion 202*b* has a posture and a position similar to those in the first embodiment (see FIG. 3). At the position Pc2, the distal end portion 202*b* is located above the base portion 202*a*.

In a state where the distal end portion 202*b* is located at the position Pc1, the distance sensor 201 is located above the surface 10*a*, and may measure the distance to the surface 10*a*. The position Pc1 is one example of a measurement position.

In contrast, in a state where the distal end portion 202*b* is located at the position Pc2, the distance sensor 201 is deviated from above the surface 10*a*, and the measurement is made impossible. Furthermore, the support member 202A and the distance sensor 201 are wholly deviated from the area A1 above the moving object 10 to move into the area A2. The position Pc2 is one example of a retraction position.

In this case, the support member 202C may include a lock pin 205*a* that locks the distal end portion 202*b* to the base portion 202*a* at the position Pc2. For example, the operator may release the lock on the base portion 202*a* of the distal end portion 202*b* by pulling out the lock pin 205*a*, rotate the distal end portion 202*b* in the counterclockwise direction in FIG. 7 from the position Pc2, and dispose the distal end portion 202*b* at the position Pc1. Furthermore, the operator rotates the distal end portion 202*b* in the clockwise direction in FIG. 7 from the position Pc1, disposes the distal end portion 202*b* at the position Pc2, and inserts the lock pin 205*a*. The operator may thereby lock the distal end portion 202*b* with the distal end portion 202*b* being disposed above the base portion 202*a*.

As described above, in the embodiment, the rotation mechanism 205 may function as a movement mechanism.

Furthermore, also in the embodiment, the base portion 202*a* supports the distal end portion 202*b* in the state illustrated in FIG. 7. The distal end portion 202*b* is connected to the base portion 202*a* in a state of being able to rotate about the rotation center C in a clockwise direction in a line of sight of FIG. 7. Therefore, when the placement portion 100*a* overruns downward beyond the position Pa1 (see FIG. 1) with the distal end portion 202*b* being located at the position Pc1, the rotation mechanism 205 lets the distance sensor 201 and the distal end portion 202*b* to escape to a side of the moving object 10, that is, in the X direction in the example of FIG. 7 similarly to FIG. 4, which may inhibit damage of the distance sensor 201 and the support member 202C. That is, in the embodiment, the rotation mechanism 205 also functions as an evacuation mechanism.

Also according to the above-described embodiment, effects similar to those in the first embodiment may be obtained. Furthermore, according to the embodiment, the rotation mechanism 205 functions as both the movement mechanism and the evacuation mechanism, so that a device configuration may be simplified. Thus, for example, effects of further reducing the weight of the lifting device 100 and further reducing labor and cost for manufacturing may be obtained.

Figure 8:
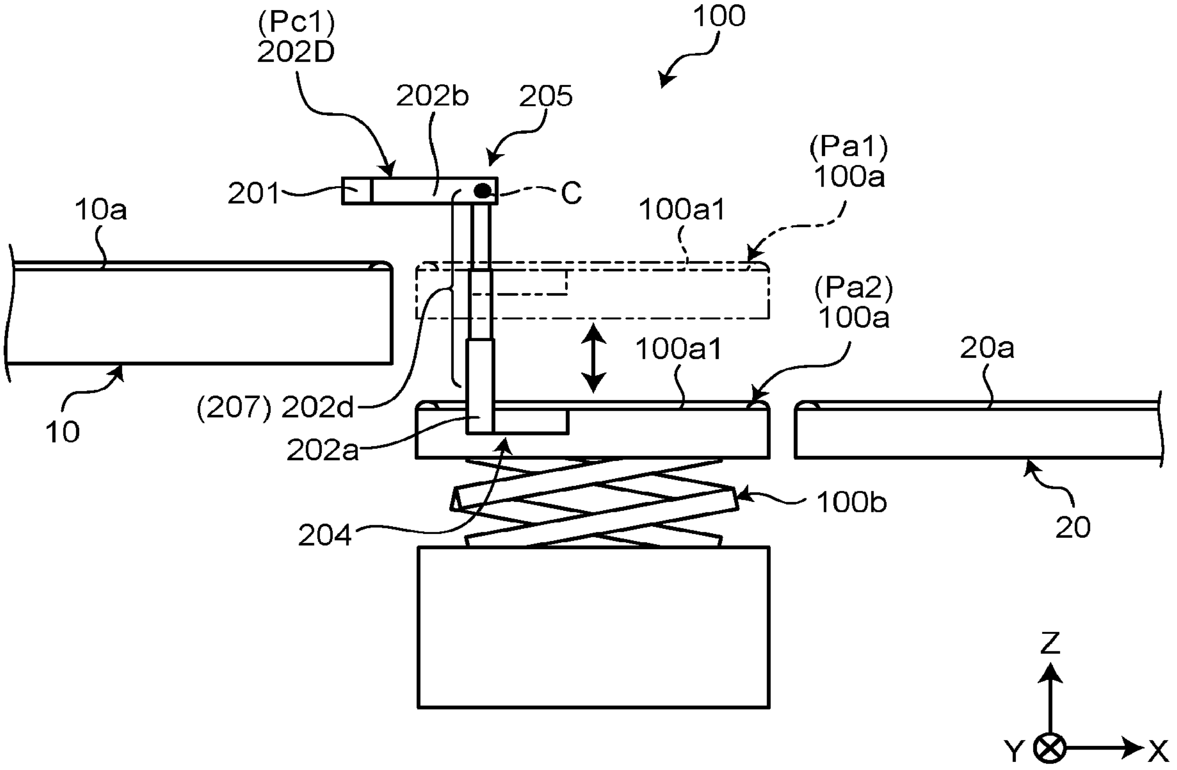
FIG. 8 is an exemplary and schematic side view of a part of a lifting device of a fourth embodiment.

FIG. 8 is a side view illustrating a part of the lifting device 100 of a fourth embodiment. In the embodiment, an example of application to a case where the moving object 10 is located at a position higher than the entrance structure 20 is described. In the embodiment, a support member 202D includes an extension portion 202*d* vertically extending between the base portion 202*a* and the distal end portion 202*b* in the state of being located at the position Pc1. When the placement portion 100*a* is located at the position Pa1, the position Pa2, and a position between the positions Pa1 and Pa2, the extension portion 202*d* may avoid the interference of the support member 202D and the distance sensor 201 with the moving object 10 even when the moving object 10 is located at a position higher than the entrance structure 20.

In this case, the extension portion 202*d* of the support member 202D may include an expansion/contraction mechanism 207 whose length may be vertically changed. The expansion/contraction mechanism 207 includes, for example, a plurality of pipes having a nested structure and connected in series. The expansion/contraction mechanism 207 has a configuration in which adjacent pipes are connected to each other so as to be able to expand and contract and relative positions (lengths) may be maintained by friction therebetween.

According to such a configuration, for example, an effect of disposing the distance sensor 201 at a position where a detection signal has higher strength in a range in which the support member 202D and the distance sensor 201 do not interfere with the moving object 10 may be obtained by the operator appropriately changing or adjusting the length of the expansion/contraction mechanism 207. Note that the shape, structure, arrangement, and the like of the expansion/contraction mechanism 207 are not limited to those in the example of FIG. 7.

As described above, the lifting device 100 of the embodiment may also be applied to a case where the moving object 10 is located at a position higher than the entrance structure 20.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A lifting device comprising:

a lifting mechanism configured to move up and down a placement portion on which a conveyed object is placed;

a distance sensor configured to output a detection signal indicating a distance to a surface to be detected of a moving object in a state of being located above the surface to be detected;

a support member provided on the placement portion and configured to support the distance sensor;

a movement mechanism configured to move, with respect to the placement portion, at least a part of the support member between a measurement position where the distance sensor is located above the surface to be detected and a retraction position where the distance sensor and the support member are deviated from above the moving object; and a lifting controller configured to control the lifting mechanism such that the placement portion is aligned with the moving object at a position where the conveyed object is allowed to be transferred in a lateral direction based on the detection signal, wherein the support member includes a base portion and a distal end portion, the base portion extending vertically, wherein the movement mechanism includes a linear motion mechanism configured to relatively and linearly move at least a part of the support member with respect to the placement portion, or a rotation mechanism configured to connect the base portion and the distal end portion such that the distal end portion is rotatable about the base portion, wherein the distance sensor is attached to the distal end portion, and wherein in the measurement position, the distal end portion is perpendicular to the base portion.

2. The lifting device according to claim 1, wherein the retraction position is a position where interference with a closed position of a movable shutter does not occur.

3. The lifting device according to claim 1, further comprising an evacuation mechanism configured to escape at least a part of the distance sensor and the support member to a side of the moving object when the distance sensor or the support member interferes with the moving object.

4. The lifting device according to claim 1, wherein the support member includes a plurality of support members, and the distance sensor is provided on each of the plurality of support members.

5. The lifting device according to claim 1, wherein the support member includes a flexible arm having a changeable shape.

6. The lifting device according to claim 1, wherein the support member includes an extension portion vertically extending in a state of being located at the measurement position.

* * * * *